US009998719B2

(12) United States Patent
Wang et al.

(10) Patent No.: US 9,998,719 B2
(45) Date of Patent: Jun. 12, 2018

(54) NON-PLANAR SURFACE PROJECTING SYSTEM, AUTO-CALIBRATION METHOD THEREOF, AND AUTO-CALIBRATION DEVICE THEREOF

(71) Applicant: INDUSTRIAL TECHNOLOGY RESEARCH INSTITUTE, Hsinchu (TW)

(72) Inventors: Te-Mei Wang, Hsinchu (TW); Zen-Chung Shih, Taipei (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 0 days. days.

(21) Appl. No.: 15/610,174

(22) Filed: May 31, 2017

(65) Prior Publication Data

US 2017/0347079 A1 Nov. 30, 2017

(30) Foreign Application Priority Data

May 31, 2016 (TW) .............................. 105117062 A
Mar. 13, 2017 (TW) .............................. 106108138 A

(51) Int. Cl.
*H04N 9/31* (2006.01)
*G06T 7/50* (2017.01)

(52) U.S. Cl.
CPC ............. *H04N 9/3194* (2013.01); *G06T 7/50* (2017.01); *H04N 9/3185* (2013.01); *H04N 9/3188* (2013.01)

(58) Field of Classification Search
CPC .. G06T 7/50; G06T 7/521; G06T 7/80; G06T 2207/10024; G06T 2207/10152;
(Continued)

(56) References Cited

U.S. PATENT DOCUMENTS 6,618,076 B1  9/2003  Sukthankar et al.
7,001,023 B2  2/2006  Lee et al.
(Continued)

FOREIGN PATENT DOCUMENTS

CN  101321303 A  12/2008
CN  101500172 A  8/2009
(Continued)

OTHER PUBLICATIONS

M. D. Grossberg et al., "Making One Object Look Like Another: Controlling Appearance Using a Projector-Camera System" Proceedings of the 2004 IEEE Computer Society Conference on Computer Vision and Pattern Recognition (CVPR '04), 2004, 8 pages.

(Continued)

*Primary Examiner* — Edward Park
(74) *Attorney, Agent, or Firm* — Muncy, Geissler, Olds & Lowe, P.C.

(57) ABSTRACT

A non-planar surface projecting system, an auto-calibration method thereof and an auto-calibration device thereof are provided. In an embodiment of the non-planar surface auto-calibration method, a depth map of a projection surface is measured, a corresponding area corresponding to a projecting area and a depth sensing area is calibrated; and in the corresponding area, an interactive content is adjusted according to the depth map of the projection surface.

24 Claims, 8 Drawing Sheets

(58) Field of Classification Search
CPC ........ G06T 2207/30204; H04N 9/3185; H04N 9/3194; H04N 9/3188
See application file for complete search history.

(56) References Cited

U.S. PATENT DOCUMENTS

| | | | |
|---|---|---|---|
| 8,009,930 B2 | 8/2011 | Li et al. | |
| 8,730,309 B2 | 5/2014 | Wilson et al. | |
| 8,923,562 B2 | 12/2014 | Lin et al. | |
| 9,142,025 B2* | 9/2015 | Park | G06T 7/0057 |
| 9,716,870 B2* | 7/2017 | Sano | H04N 9/3194 |
| 2003/0142116 A1 | 7/2003 | Mochizuki | |
| 2009/0086081 A1* | 4/2009 | Tan | G01B 11/25 |
| | | | 348/333.1 |
| 2010/0060803 A1* | 3/2010 | Slack | H04N 7/142 |
| | | | 348/744 |
| 2011/0007283 A1 | 1/2011 | Tanaka | |
| 2014/0168367 A1 | 6/2014 | Kang | |
| 2015/0296192 A1 | 10/2015 | Maeda | |

FOREIGN PATENT DOCUMENTS

| | | |
|---|---|---|
| CN | 204929116 U | 12/2015 |
| TW | I312100 | 7/2009 |
| TW | I379147 | 12/2012 |
| TW | I408489 | 9/2013 |
| TW | I513313 | 12/2015 |
| WO | WO 2006/110141 A2 | 10/2006 |

OTHER PUBLICATIONS

R. Raskar et al., "Multi-Projector Displays Using Camera-Based Registration" *Proceedings Visualization '99*, Oct. 24-29, 1999, San Francisco, CA, 9 pages.
R. Sukthankar et al., "Smarter Presentations: Exploiting Nomography in Camera-Projector Systems" *Proceedings in International Conference on Computer Vision*, 2001, 7 pages.
M. Kimura et al., "Projector Calibration using Arbitrary Planes and Calibrated Camera", *2007 IEEE Conference on Computer Vision and Pattern Recognition*, 2007, 2 pages.
G. Falcao, et al., "Plane-based calibration of a projector-camera system" *VIBOT Master 9.1* (2008) 12 pages.

* cited by examiner

NON-PLANAR SURFACE PROJECTING SYSTEM, AUTO-CALIBRATION METHOD THEREOF, AND AUTO-CALIBRATION DEVICE THEREOF

CROSS-REFERENCE TO RELATED APPLICATION

This application claims the priority benefits of Taiwan application serial no. 105117062, filed on May 31, 2016 and Taiwan application serial no. 106108138, filed on Mar. 13, 2017. The entirety of the above-mentioned patent applications is hereby incorporated by reference.

TECHNICAL FIELD

The technical field relates to a non-planar surface projecting system, an auto-calibration device thereof and an auto-calibration method thereof.

BACKGROUND

Most interactive projectors, such as Epson BrightLink 595Wi and its similar products, have to project images onto a flat surface during calibration. The calibration might fail if the projection surface is not flat enough or is partially covered by some objects. Those projectors could not automatically sense the projection area during calibration, the projection area is manually marked by users instead. Even the professionals need to spend a lot of time in adjusting the projector's position and repeating the calibration steps several times to complete the calibration. Because the calibration is pretty time-consuming, those projectors are usually installed in a fixed position to avoid re-calibration. Such kind of calibration method is not suitable for a portable interactive projection device that moves often.

SUMMARY

According to an embodiment of the disclosure, an auto-calibration method for a non-planar surface projecting system is provided. The auto-calibration method for a non-planar surface projecting system comprises the following steps: estimating a depth map of a projection surface; calibrating a corresponding area of a projection area and a depth sensing area; and adjusting an interactive content within the corresponding area according to the depth map of the projection surface. The step of calibrating the corresponding area of the projection area and the depth sensing area comprises the following step: projecting at least two calibration patterns onto the projection surface according to a plurality of predetermined locations of a projection device and a depth sensing device; capturing an image of the projection surface and detecting a plurality of locations of the at least two calibration patterns in the image; obtaining a plurality of locations of the at least two calibration patterns in the depth map; adjusting a projection location of the at least two calibration patterns according to the plurality of locations of the at least two calibration patterns in the image and the depth map to obtain at least two anchor points in the depth map, wherein the at least two anchor points are within the projection area and the depth sensing area; and calibrating the corresponding area of the projection area and the depth sensing area according to the at least two anchor points. The step of adjusting the interactive content within the corresponding area according to the depth map of the projection surface comprises the following step: projecting the interactive content within the corresponding area of the depth sensing area; deforming the interactive content according to the depth map of the projection surface; and adjusting a relative position of the interactive content according to the depth map of the projection surface.

According to another embodiment of the disclosure, a non-planar surface projecting system is provided. The non-planar surface projecting system comprises a depth sensing device, a projecting device, an image capturing device and an auto-calibration device. The depth sensing device is configured to estimate a depth map of a projection surface. The projecting device is configured to project at least two calibration patterns and an interactive content onto the projection surface. The projecting device and the depth sensing device project the at least two calibration patterns onto the projection surface according to a plurality of predetermined locations of a depth sensing device, and the interactive content is adjusted and projected by an auto-calibration device. The image capturing device is configured to capture an image of the projection surface. The auto-calibration device is configured to calibrate a corresponding area of a projection area and a depth sensing area, and adjust the interactive content within the corresponding area according to the depth map of the projection surface. The auto-calibration device comprises a corresponding area correcting unit and an interactive content adjusting unit, the corresponding area correcting unit is configured to detect the at least two calibration patterns in the image and obtain a plurality of locations of the at least two calibration patterns in the depth map, and the interactive content adjusting unit is configured to adjust the interactive content in corresponding area according to the depth map of the projection surface. The auto-calibration device is further configured to adjust a projection location of the at least two calibration patterns according to the plurality of locations in the image and depth map of the at least two calibration patterns to obtain at least two anchor points of the depth map, wherein the at least two anchor points are within the projection area and the depth sensing area, and obtain the corresponding area of the projection area and the depth sensing area according to the at least two anchor points.

According to another embodiment of the disclosure, an auto-calibration device is provided. The auto-calibration device is connected to a depth sensing device, a projecting device, and an image capturing device. The depth sensing device is configured to estimate a depth map of a projection surface. The projecting device is configured to project at least two calibration patterns onto the projection surface according to a projection location. The image capturing device is configured to capture an image of the projection surface. The auto-calibration device comprises a corresponding area correcting unit and an interactive content adjusting unit. The area corresponding area correcting unit comprises a detecting unit, a calculating unit, a position adjusting unit, an area setting unit, an image scaling unit, an image masking unit, an image segmenting unit, an image moving unit, and an image combining unit. The detecting unit is configured to detect a plurality of locations of the at least two calibration patterns in the image. The calculating unit is configured to obtain a plurality of locations of the at least two calibration patterns in the depth map. The position adjusting unit is configured to adjust the projection location of the at least two calibration patterns according to the plurality of locations in the image and the depth map of the at least two calibration patterns to obtain at least two anchor points in the depth map. The at least two anchor points are within the projection area and the depth sensing area. The area setting unit is configured to obtain a calibrated corresponding area of the projection area and the depth sensing area according to the at least two anchor points. The interactive content adjusting unit comprises an image scaling unit, an image masking unit, an image masking unit, an image segmenting unit, an image moving unit, and an image combining unit. The image scaling unit is configured to zoom in or zoom out the interactive content according to the corresponding area of the projection area and the depth sensing area. The image masking unit is configured to mask the interactive content beyond the corresponding area when the projection area is larger than the depth sensing area. The image deforming unit is configured to deforming the interactive content according to the depth map of the projection surface. The image segmenting unit is configured to distinguish foreground objects from the background. The image moving unit is configured to adjust a relative position of a projected character or pattern according to the depth map of the projection surface when an object is placed on the projection surface. The image combining unit is configured to combine the processing results of the image scaling unit, the image masking unit, the image deforming unit, the image segmenting unit, and the image moving unit, and transmit combined processing results to the projecting device.

The foregoing will become better understood from a careful reading of a detailed description provided herein below with appropriate reference to the accompanying drawings.

DETAILED DESCRIPTION OF DISCLOSED EMBODIMENTS

Figure 1:
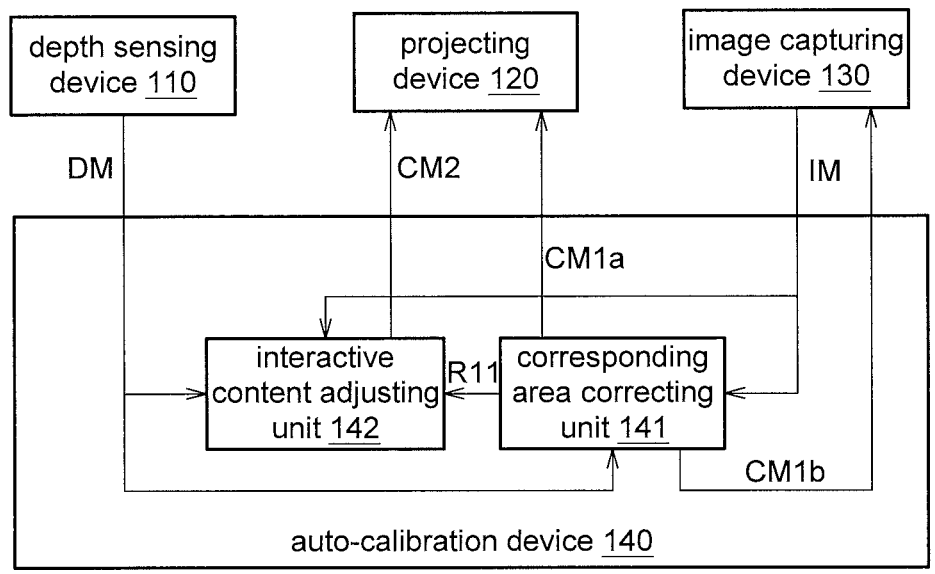
FIG. 1 is a schematic diagram of a non-planar surface projecting system according to an embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 2:
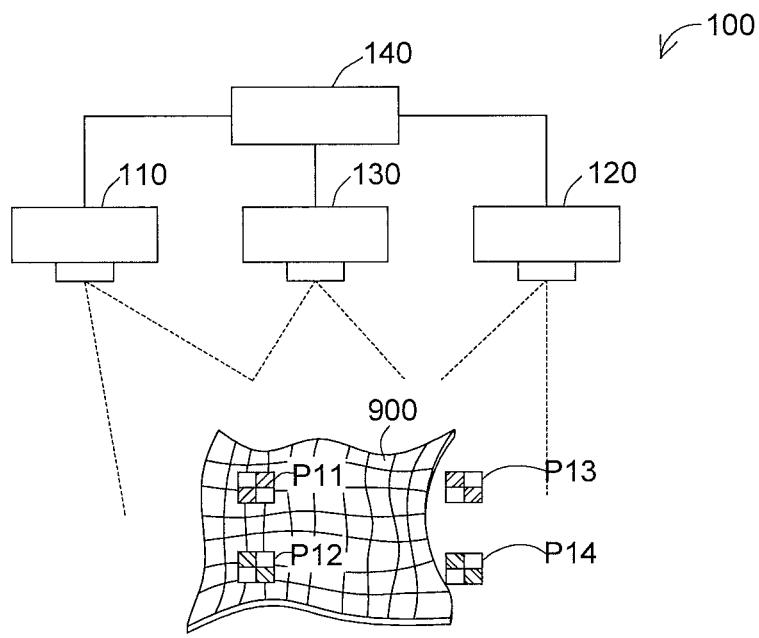
FIG. 2 is a schematic view of a non-planar surface projecting system applied to a non-planar projection surface according to an embodiment of the disclosure.

Please refer to FIG. 1 and FIG. 2. FIG. 1 is a schematic diagram of a non-planar surface projecting system 100 according to an embodiment of the disclosure. FIG. 2 is a schematic view of the non-planar surface projecting system 100 applied to a non-planar surface of a projection surface 900 according to an embodiment of the disclosure. The non-planar surface projecting system 100 may be, but not limited to a projector, a smartboard, a smart wall lamp, a smart table lamp, a smart table, a smart furnace or a smart stove. The smartboard, the smart wall lamp, the smart table lamp, the smart table, the smart furnace or the smart stove may carry on an interactive projection with the user's palm or limb in the foreground. The projection may be carried onto a non-planar surface of the projection surface 900. An auto-calibration of the non-planar surface projecting system 100 in the embodiment is performed by using a depth capturing technology, a projecting technology, an image capturing technology and an auto control technology, so as to the non-planar surface projecting system 100 may carry on an projection according to various changes of the non-planar surface of the projection surface 900 and avoid a distortion of a projection image. In the interactive projection, the non-planar surface projecting system 100 may avoid the protrusion of the projection surface 900 being wrongly identified as an object of an interactive operation (for example, the palm or limb).

Referring to FIG. 1, the non-planar surface projecting system 100 comprises a depth sensing device 110, a projecting device 120, an image capturing device 130 and an auto-calibration device 140. The depth sensing device 110, for example, a dual-camera, a structured-light depth sensing device, a Time of Flight depth sensing device, or a LiDAR depth sensing device, is used to estimate a depth map of a projection surface. The projecting device 120, for example, a cathode ray tube projector (CRT projector), a liquid crystal display (LCD projector), or a digital light processing projector (DLP projector), is used to project an image and calibration patterns.

Figure 3:
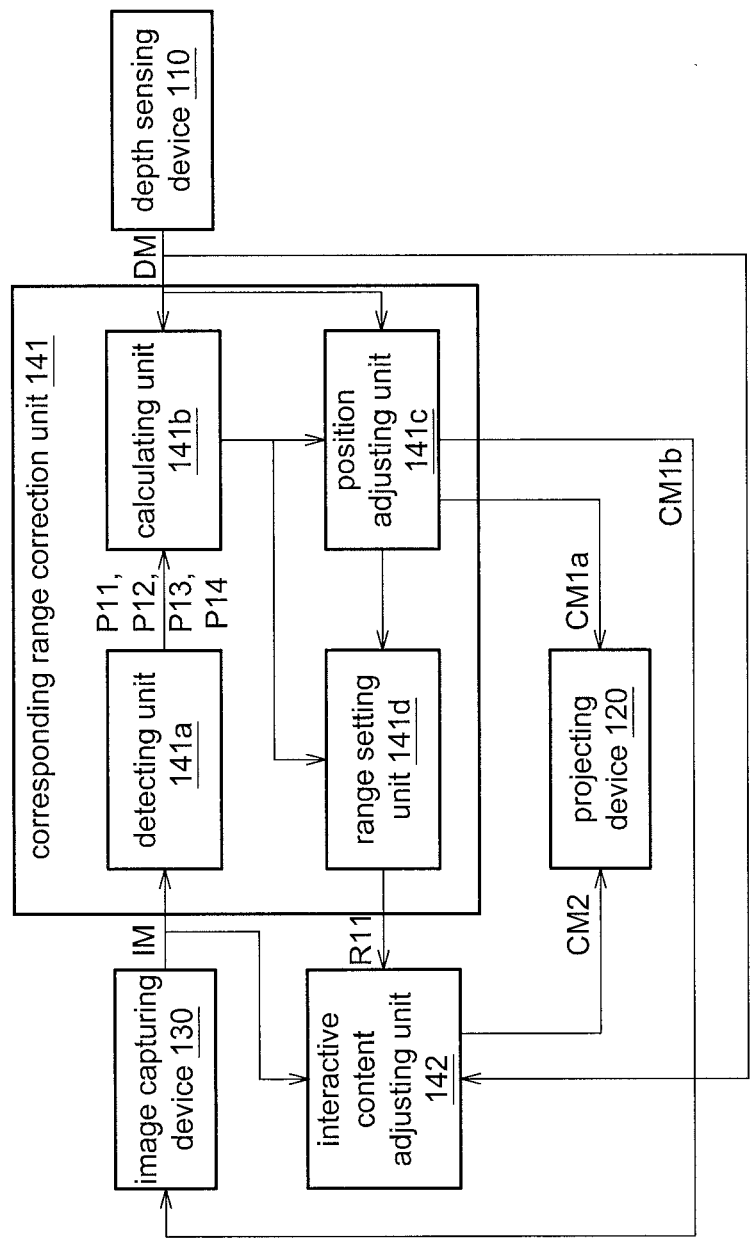
FIG. 3 is a schematic diagram of a corresponding area correcting unit according to an embodiment of the disclosure.

The image capturing device 130, for example, a color camera or a monochrome camera, is used to capture an image. The auto-calibration device 140, for example, a chip, a circuit, a circuit board or a storage medium for storing program codes, is used to perform each of calculation procedure(s), determination procedure(s), detection procedure(s) and control procedure(s) and is configured to calibrate a corresponding area of a projection area and a depth sensing area. The auto-calibration device 140 comprises a corresponding area correcting unit 141 and an interactive content adjusting unit 142. The corresponding area correcting unit 141 is configured to calibrate the corresponding area of the projection area and the depth sensing area. The interactive content adjusting unit 142 based on a control signal CM2 is configured to adjust an interactive content within the corresponding area according to the depth map of the projection surface. Please refer to the corresponding area correcting unit 141 in FIG. 3. The corresponding area correcting unit 141 comprises a detecting unit 141a, a calculating unit 141b, a position adjusting unit 141c, a area setting unit 141d. The detecting unit 141a is configured to perform various detection procedures on the image captured by the image capturing device 130.

The calculating unit 141b is configured to perform various calculation procedures. The position adjusting unit 141c is configured to perform various position adjusting procedures.

Figure 4:
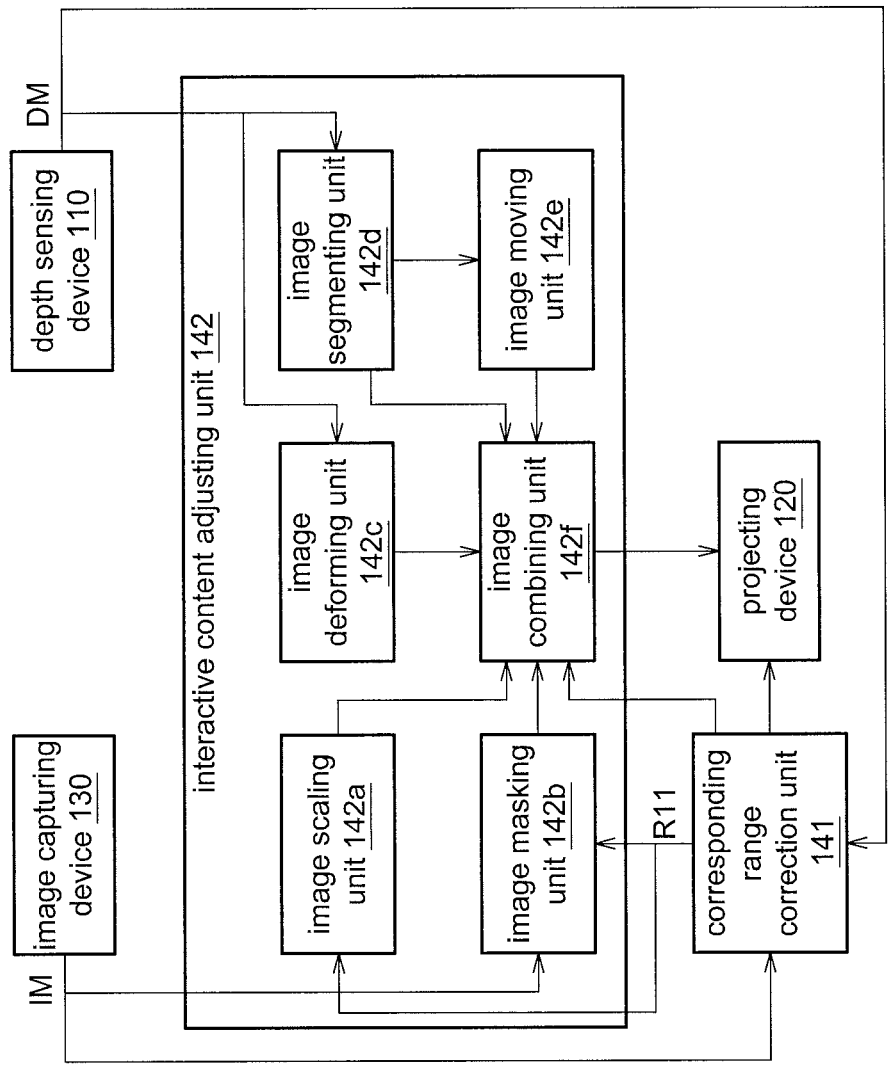
FIG. 4 is a schematic diagram of an interactive content adjusting unit according to an embodiment of the disclosure.

The area setting unit 141*d* is configured to set a calibrated corresponding area of the projection area and the depth sensing area. Please refer to the interactive content adjusting unit 142 in FIG. 4. The interactive content adjusting unit 142 comprises an image scaling unit 142*a*, an image masking unit 142*b*, an image deforming unit 142*c*, an image segmenting unit 142*d*, an image moving unit 142*e*, an image combining unit 142*f*. The image scaling unit 142*a* is configured to zoom in or zoom out the interactive content according to the corresponding area of the projection area and the depth sensing area. The image masking unit 142*b* is configured to mask the interactive content beyond the corresponding area when the projection area is larger than the depth sensing area. The image deforming unit 142*c* is configured to deforming the interactive content according to the depth map of the projection surface. The image segmenting unit 142*d* is configured to distinguish background objects from a foreground according to the depth map of the projection surface. The image moving unit 142*e* is configured to adjust a relative position of a projected character or pattern according to the depth map of the projection surface when a foreground is determined by the image segmenting unit 142*d* on the projection surface. The image combining unit 142*f*, is configured to combine the processing results of the image scaling unit 142*a*, the image masking unit 142*b*, the image deforming unit 142*c*, the image segmenting unit 142*d*, and the image moving unit 142*e*, and transmit the combined processing results to the projecting device 120.

Figure 5:
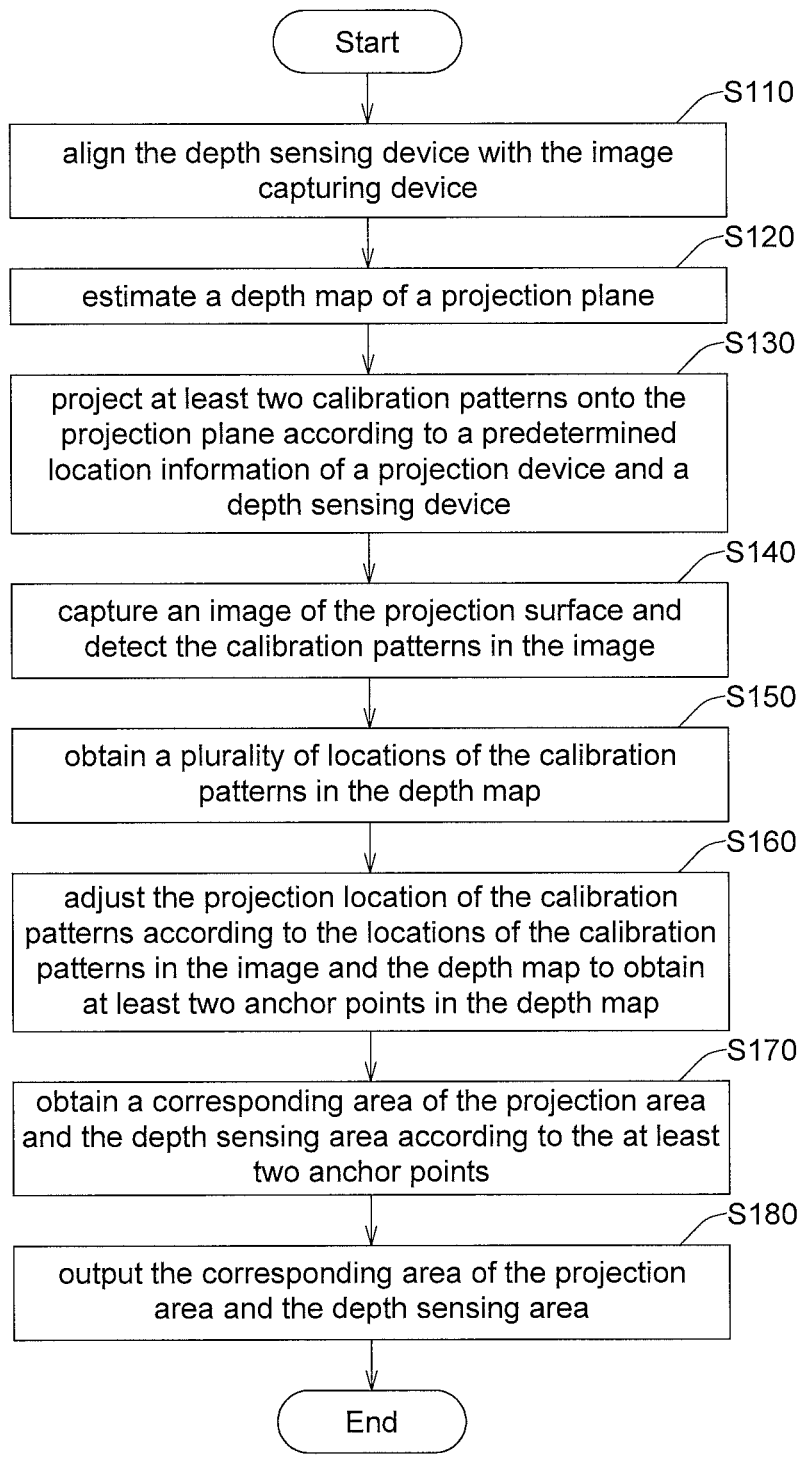
FIG. 5 is a flow chart of the corresponding area correcting method according to an embodiment of the disclosure.
Figure 7A:
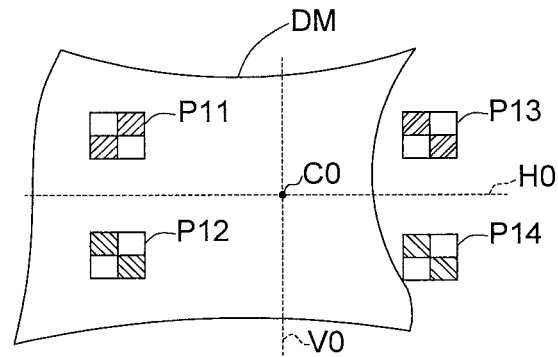
FIG. 7A to FIG. 7C illustrate schematic views of the steps in FIG. 5, respectively.
Figure 7B:
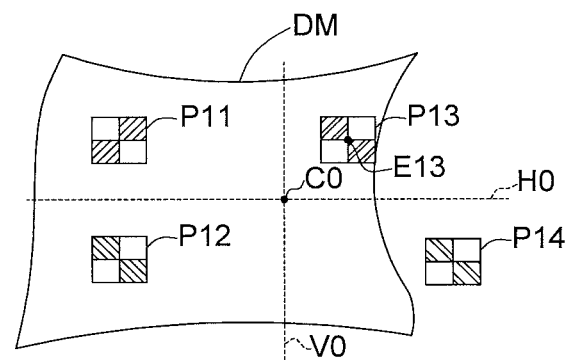
Figure 7C:
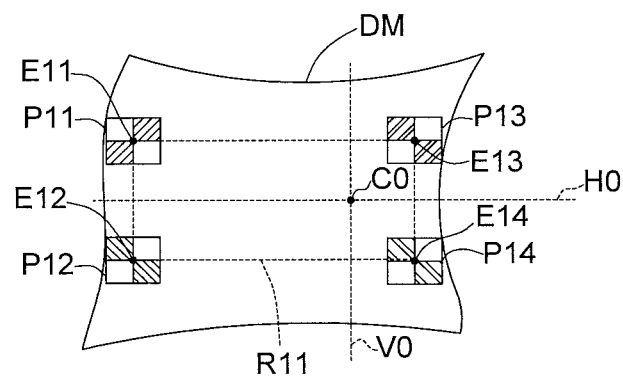

Please refer to FIG. 1 to FIG. 3, FIG. 5, and FIG. 7A to FIG. 7C. FIG. 5 illustrates a flow chart of a corresponding area correcting method of an auto-calibration method for the non-planar surface projecting system 100 according to an embodiment of the disclosure. FIG. 7A to FIG. 7C illustrate schematic views of the steps of FIG. 5, respectively. In the step S110, align the depth sensing device 110 with the image capturing device 130. In this step, the depth sensing device 110 and the image capturing device 130 may take pictures of a calibrated checkerboard and obtain a 3D spatial information.

In the step S120, as illustrated in FIG. 2, the depth sensing device 110 estimates a depth map DM of a projection surface 900 (illustrated in FIG. 7A). In other embodiment, the depth sensing device 110 builds a three-dimensional mesh (3D mesh). The 3D mesh may be, but not limit to a 3D triangular mesh or a 3D rectangular mesh. The depth sensing device 110 may project an infrared light onto the non-planar surface of the projection surface 900, and obtain a depth map or build a 3D mesh according to the refracted infrared light.

In the step S130, as illustrated in FIG. 2, the projecting device 120 projects at least two calibration patterns (for example, calibration patterns P11, P12, P13, P14) onto the projection surface 900 according to a plurality of predetermined locations of a projecting device and a depth sensing device. The calibration patterns P11, P12, P13, and P14 are different. Different shadings represent different colors, and the color arrangements of the calibration patterns P11, P12, P13, and P14 are different. Therefore, the calibration patterns P11, P12, P13, and P14 may be identified by the color arrangements.

In the step S140, as illustrated in FIG. 2, the image capturing device 130 captures an image IM of the projection surface 900. The detecting unit 141*a* of the corresponding area correcting unit 141 may detect the locations of the calibration patterns P11, P12, P13, and P14 in the image IM. In this step, the detecting unit 141*a* may identify the locations of the calibration patterns P11, P12, P13, and P14 by using a template matching algorithm.

In the step S150, as illustrated in FIG. 7A, the calculating unit 141*b* of the corresponding area correcting unit 141 is configured to obtain a plurality of locations of the calibration patterns P11, P12, P13, and P14 in the depth map. In other embodiment, the locations for the calibration patterns P11, P12, P13, and P14 in the image IM are identified by using a 3D spatial conversion matrix of the 3D mesh TM.

In the step S160, the position adjusting unit 141*c* of the corresponding area correcting unit 141 is configured to transmit a control signal CM1*a* to adjust the projection location of the calibration patterns P11, P12, P13 and P14 according to the locations of the calibration patterns P11, P12, P13 and P14 in the image and the depth map to obtain at least two anchor points in the depth map. Then, the position adjusting unit 141*c* is configured to transmit a control signal CM1*b* to the image capturing device 130 and capture the image IM of the projection surface 900. The detecting unit 140*a* is configured to detect the calibration patterns P11, P12, P13, and P14 again and obtain the locations of the calibration patterns P11, P12, P13, and P14 in the image IM, respectively. The step S160 is repeated until the anchor points of the depth map DM are obtained. The anchor points are within the projection area and the depth sensing area.

For example, the calibration patterns P13, P14 are located outside the depth map DM as illustrated in FIG. 7A, the projecting device 120 is configured to move the calibration pattern P13 toward a projection central point C0 or a projection central axis (for example, a horizontal projection central axis H0 or a vertical projection central axis V0).

As illustrated in FIG. 7B, the calibration pattern P13 is stopped moving until the calibration pattern P13 is completely moved into the depth map DM and is identified. At this time, the position adjusting unit 141*c* may obtain an anchor point E13. Similarly, as illustrated in FIG. 7B to FIG. 7C, the projecting device 120 is configured to move the calibration pattern P14 located outside the depth map DM toward the projection central point C0, the horizontal projection central axis H0 or the vertical projection central axis V0. The calibration pattern P14 is stopped moving until the calibration pattern P14 is completely moved into the depth map DM and is identified. At this time, the position adjusting unit 141*c* may obtain an anchor point E14.

As illustrated in FIG. 7B to FIG. 7C, the projecting device 120 is configured to move the calibration patterns P11 and P12 located inside the depth map DM outward the projection central point C0, the horizontal projection central axis H0 or the vertical projection central axis V0. The calibration patterns P11, P12 are stopped moving until the calibration patterns P11 and P12 are partially moved out of the depth map DM and are identified. At this time, the position adjusting unit 141*c* may obtain two anchor points E11 and E12.

In the step S170, the area setting unit 141*d* of the corresponding area correcting unit 141 is configured to locate a corresponding area R11 of the projection area and the depth sensing area according to the at least two anchor points E11, E12, E13, and E14. The corresponding area R11 is the maximum inscribed rectangle of the anchor points E11, E12, E13 and E14.

In the step S180, the area setting unit 141*d* of the corresponding area correcting unit 141 is configured to output the corresponding area R11 of the corrected projection area and the depth sensing area to the interactive content adjusting unit 142.

Figure 6:
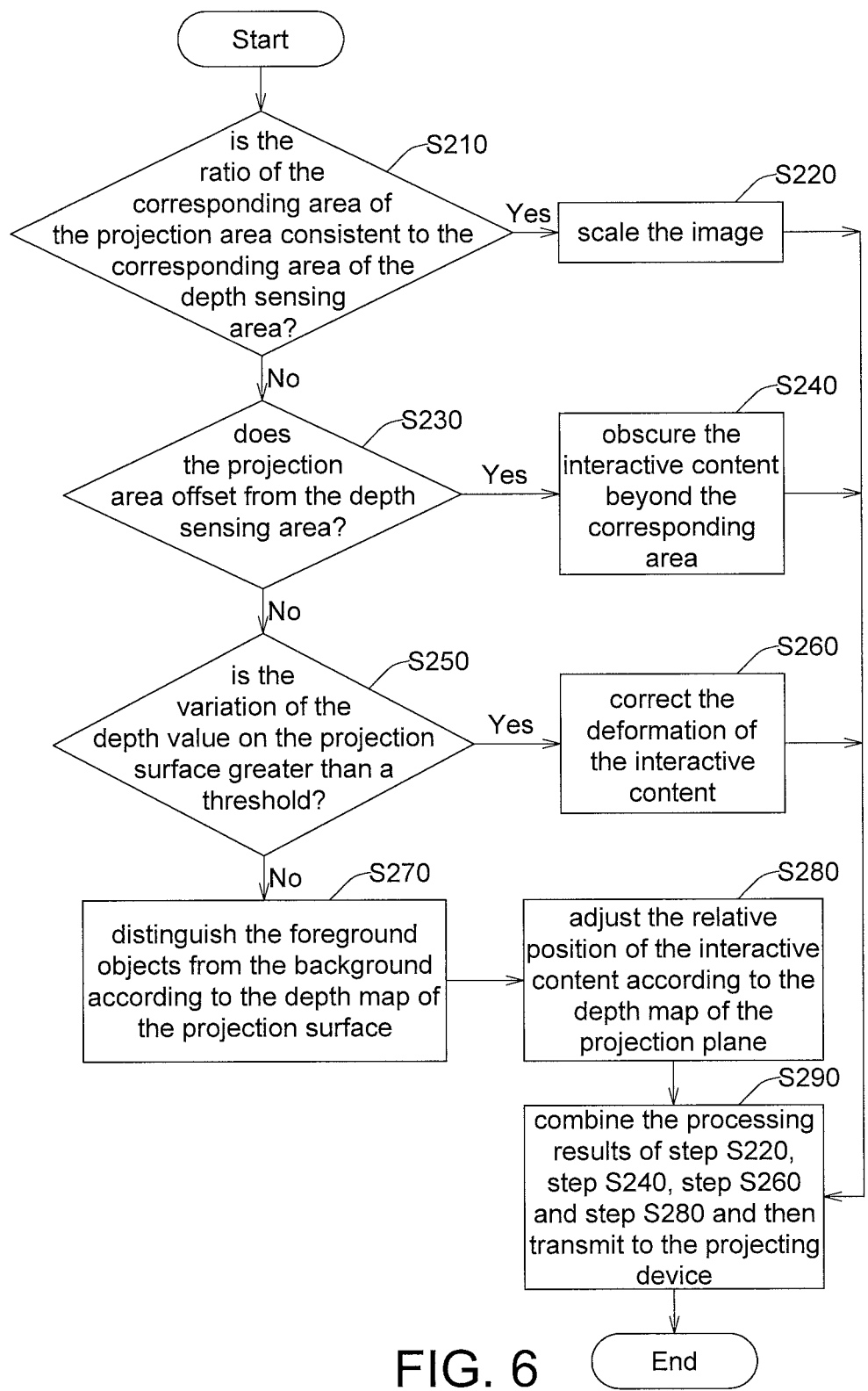
FIG. 6 is a flow chart of the interactive content adjusting method according to an embodiment of the disclosure.

FIG. 6 is a flow chart of the interactive content adjusting method of the non-planar surface projecting system 100 according to an embodiment of the disclosure. In step S210, determine whether the ratio of the corresponding area R11 of the projection area is consistent to the corresponding area R11 of the depth sensing area. If the ratio of the corresponding area R11 of the projection area is inconsistent to the corresponding area R11 of the depth sensing area, the step S220 is performed to scale the image. If the ratio of the corresponding area R11 of the projection area is consistent to the corresponding area R11 of the depth sensing area, the step S230 is performed to determine whether the projection area offsets from the depth sensing area. If the projection area offsets from the depth sensing area, the step S240 is performed to obscure the interactive content beyond the corresponding area R11. If the projection area does not offset from the depth sensing area, the step S250 is performed to determine whether the variation of the depth value on the projection surface is greater than a threshold. If the variation of the depth value of the projection surface is greater than a threshold, it represents the projection surface is a non-planar surface. Thus, the step S260 is performed to deform the interactive content. If the variation of the depth value of the projection surface depth value is less than or equal to a threshold, it represents the projection surface is regarded as a planar surface. Thus, it is not necessary to deform the interactive content. The step S270 is performed to distinguish the foreground objects from the background according to the depth map of the projection surface. Next, step S280 is performed to adjust a relative position of the interactive content according to the depth map of the projection surface, and the interactive content of the projection is prevented from interfering with the object placed on the projection surface. Finally, combine the processing results of step S220, step S240, step S260 and step S280 in step S290, and then transmit the combined results to the projecting device 120. This allows the non-planar surface projecting system 100 to automatically correct the corresponding area R11 of the projection area and the depth sensing area and adjust the interactive content according to the depth information of the projection surface 900 within the corresponding area R11. The non-planar surface projecting system 100 may avoid the distortion of a projection image or avoid the protrusion of the projection surface 900 being wrongly identified as an interactive operation (for example, the palm or limb).

Figure 8:
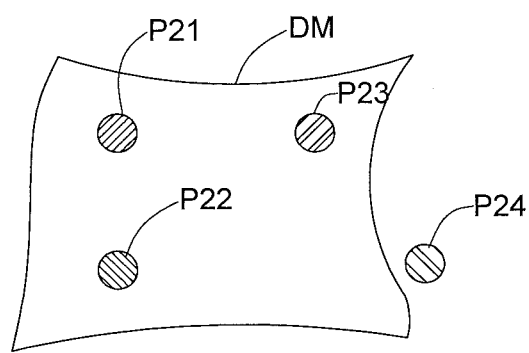
FIG. 8 is a schematic view of the calibration patterns according to another embodiment of the disclosure.

FIG. 8 is a schematic view of the calibration patterns P21, P22, P23, and P24 according to another embodiment of the disclosure. In the embodiment, the calibration patterns P21, P22, P23, and P24 projected by the projecting device 120 in the step S130 may have the same shape but different colors. The image capturing device 130 may be a color camera. In step S140, the detecting unit 141a of the corresponding area correcting unit 141 may obtain the calibration patterns P21, P22, P23, and P24 by using color comparison.

Figure 9:
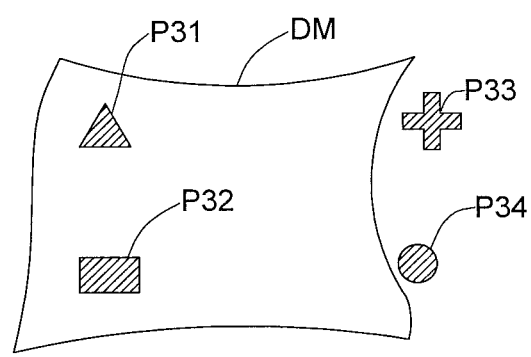
FIG. 9 is a schematic view of the calibration patterns according to still another embodiment of the disclosure.

FIG. 9 is a schematic view of calibration patterns P31, P32, P33, and P34 according to still another embodiment of the disclosure. In the embodiment, the calibration patterns P31, P32, P33, and P34 projected by the projecting device 120 in the step S130 may have the same color but different shapes. The image capturing device 130 may be a monochrome camera. In step S140, the detecting unit 141a of the corresponding area correcting unit 141 may obtain the calibration patterns P31, P32, P33, and P34 by using shape comparison.

Figure 10:
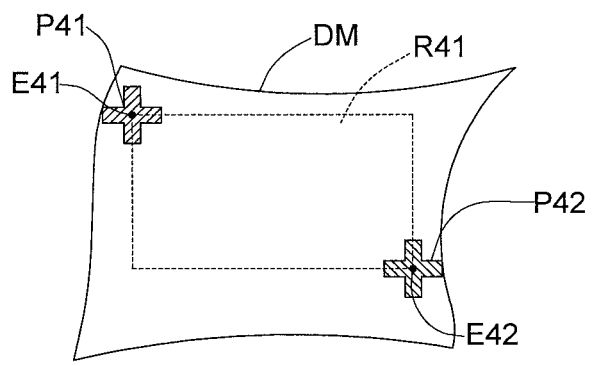
FIG. 10 is a schematic view of the calibration patterns according to another embodiment of the disclosure.

FIG. 10 is a schematic view of calibration patterns P41, P42 according to another embodiment of the disclosure. In the embodiment, a number of the calibration patterns are two. In the step S170, the position adjusting unit 141c of the corresponding area correcting unit 141 is configured to move the calibration patterns P41 and P42 and use the found anchor points E41 and E42 of the calibration patterns P41 and P42 as the diagonal of a rectangle to locate a rectangular corresponding area R41 of a projection area and a depth sensing area.

Figure 11:
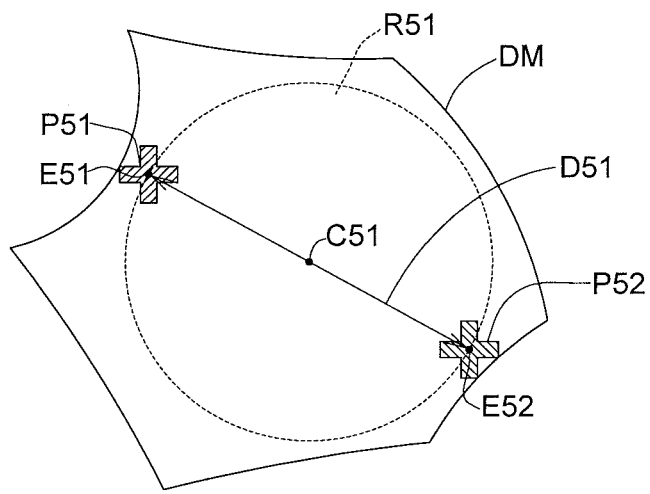
FIG. 11 is a schematic view of the calibration patterns according to still another embodiment of the disclosure.

FIG. 11 is a schematic view of calibration patterns P51 and P52 according to still another embodiment of the disclosure. In the embodiment, a number of the calibration patterns are two. In the step S170, the position adjusting unit 141c of the corresponding area correcting unit 141 is configured to move the calibration patterns P51 and P52 and use the found anchor points E51 and E52 of the calibration patterns P51 and P52 as a diameter D51 of a circle, and take the central point of diameter D51 as a centre C51 of the circle to obtain a circular corresponding area R51 of a projection area and a depth sensing area.

According to the various embodiments described above, through the steps of projection and moving of the calibration patterns, the corresponding area of the projection area and the depth sensing area may be corrected by the projected calibration patterns and the operation of moving the calibration pattern, and within the corresponding area, the interactive content is adjusted according to the depth map of the projection surface. So that the non-planar surface projecting system can project the interactive content within the corresponding area of the projection area and the depth sensing area. The non-planar surface projecting system may deform the interactive content according to the depth map of a projection surface. When the object is placed on the surface, the non-planar surface projecting system may adjust the relative position of the interactive content based on the depth map of the projection surface.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An auto-calibration method for a non-planar surface projecting system, comprising:
   estimating a depth map of a projection surface;
   calibrating a corresponding area of a projection area and a depth sensing area, wherein calibrating the corresponding area of the projection area and the depth sensing area comprises:
      projecting at least two calibration patterns onto the projection surface according to a plurality of predetermined locations of a projecting device and a depth sensing device;
      capturing an image of the projection surface and detecting a plurality of locations of the at least two calibration patterns in the image;
      obtaining a plurality of locations of the at least two calibration patterns in the depth map;
      adjusting a projection location of the at least two calibration patterns according to the plurality of locations in the image and the depth map of the at least two calibration patterns to obtain at least two anchor points in the depth map, wherein the at least two anchor points are within the projection area and the depth sensing area; and
      calibrating the corresponding area of the projection area and the depth sensing area according to the at least two anchor points; and
   adjusting an interactive content within the corresponding area according to the depth map of the projection surface, wherein adjusting the interactive content within the corresponding area according to the depth map of the projection surface comprises:
projecting the interactive content within the corresponding area of the depth sensing area;
deforming the interactive content according to the depth map of the projection surface; and
adjusting a relative position of the interactive content according to the depth map of the projection surface.

2. The auto-calibration method for a non-planar surface projecting system as recited in claim 1, wherein adjusting the projection location is performed and said calibration patterns in the depth map are partially moved out of the depth map, or said calibration patterns outside the depth map are fully moved into the depth map to obtain the at least two anchor points.

3. The auto-calibration method for a non-planar surface projecting system as recited in claim 1, wherein said calibration patterns located outside the depth map are moved toward a projection central point or a projection central axis, in performing the step of adjusting the projection location.

4. The auto-calibration method for a non-planar surface projecting system as recited in claim 1, wherein said calibration patterns located inside the depth map are moved outward a projection central point or a projection central axis, in performing the step of adjusting the projection location.

5. The auto-calibration method for a non-planar surface projecting system as recited in claim 1, wherein all of said at least two calibration patterns are different.

6. The auto-calibration method for a non-planar surface projecting system as recited in claim 1, wherein all color arrangements for all of said at least two calibration patterns are different.

7. The auto-calibration method for a non-planar surface projecting system as recited in claim 1, wherein all shapes of all of said at least two calibration patterns are different.

8. The auto-calibration method for a non-planar surface projecting system as recited in claim 1, wherein a number of said at least two calibration patterns are four, and the calibrated corresponding area is a maximum inscribed rectangle.

9. A non-planar surface projecting system, comprising:
a depth sensing device, estimating a depth map of a projection surface;
a projecting device, projecting at least two calibration patterns and an interactive content onto the projection surface, wherein the projecting device and the depth sensing device project the at least two calibration patterns onto the projection surface according to a plurality of predetermined locations of a depth sensing device, and the interactive content is adjusted and projected by an auto-calibration device;
an image capturing device, capturing an image of the projection surface; and
an auto-calibration device, calibrating a corresponding area of a projection area and a depth sensing area according to at least two anchor points, and adjusting the interactive content within the corresponding area according to the depth map of the projection surface;
wherein the auto-calibration device comprises a corresponding area correcting unit and an interactive content adjusting unit, the corresponding area correcting unit is configured to detect a plurality of locations of the at least two calibration patterns in the image and obtain a plurality of locations of the at least two calibration patterns in the depth map, and the interactive content adjusting unit is configured to adjust the interactive content according to the depth map of the projection surface;
wherein the auto-calibration device is configured to adjust a projection location of the at least two calibration patterns according to the plurality of locations in the image and the depth map of the at least two calibration patterns within the projection area and the depth sensing area to obtain at least two anchor points in the depth map, and locate the corresponding area of the projection area and the depth sensing area according to the at least two anchor points.

10. The non-planar surface projecting system as recited in claim 9, wherein the corresponding area correcting unit partially moves said calibration patterns in the depth map out of the depth map, or fully moves said calibration patterns outside the depth map into the depth map to obtain said anchor points.

11. The non-planar surface projecting system as recited in claim 9, wherein the projecting device is controlled by the corresponding area correcting unit to move said calibration patterns toward a projection central point or a projection central axis.

12. The non-planar surface projecting system as recited in claim 9, wherein the projecting device is controlled by the corresponding area correcting unit to move said calibration patterns outward a projection central point or a projection central axis.

13. The non-planar surface projecting system as recited in claim 9, wherein all of said at least two calibration patterns are different.

14. The non-planar surface projecting system as recited in claim 9, wherein the image capturing device is a color camera, and all color arrangements for all of said at least two calibration patterns are different.

15. The non-planar surface projecting system as recited in claim 9, wherein the image capturing device is monochrome camera, and all shapes of all of said at least two calibration patterns are different.

16. The non-planar surface projecting system as recited in claim 9, wherein a number of the at least two calibration patterns are four, and the calibrated corresponding area is a maximum inscribed rectangle.

17. A auto-calibration device, connected to a depth sensing device, a projecting device, and an image capturing device, wherein the depth sensing device is configured to estimate a depth map of a projection surface, the projecting device is configured to project at least two calibration patterns and an interactive content onto the projection surface according to a projection location, the image capturing device is configured to capture an image of the projection surface, and the auto-calibration device comprises a corresponding area correcting unit and an interactive content adjusting unit, wherein the corresponding area correcting unit comprises:
a detecting unit, detecting the at least two calibration patterns of the image;
a calculating unit, obtaining a plurality of locations of the at least two calibration patterns in the depth map;
a position adjusting unit, adjusting a projection location of the at least two calibration patterns according to the plurality of locations of the at least two calibration patterns in the depth map to obtain at least two anchor points, wherein the at least two anchor points are within a projection area and a depth sensing area; and a area setting unit, locate the corresponding area of the projection area and the depth sensing area according to the at least two anchor points;

wherein the interactive content adjusting unit comprises:

an image scaling unit, zooming in or zooming out the interactive content according to the corresponding area of the projection area and the depth sensing area;

an image masking unit, masking the interactive content beyond the corresponding area when the projection area is larger than the depth sensing area;

an image deforming unit, deforming the interactive content according to the depth map of the projection surface;

an image segmenting unit, distinguishing foreground objects from a background;

an image moving unit, adjusting a relative position of a projected character or pattern according to the depth map of the projection surface when an object is placed on the projection surface; and an image combining unit, combining processing results of the image scaling unit, the image masking unit, the image deforming unit, the image segmenting unit, and the image moving unit, and transmitting combined processing results to the projecting device.

18. The auto-calibration device as recited in claim 17, wherein the position adjusting unit partially moves said calibration patterns in the depth map out of the depth map, or fully moves said calibration patterns outside the depth map into the depth map to obtain said anchor points.

19. The auto-calibration device as recited in claim 17, wherein the projecting device is controlled by the position adjusting unit to move said calibration patterns toward a projection central point or a projection central axis.

20. The auto-calibration device as recited in claim 17, wherein the projecting device is controlled by the position adjusting unit to move said calibration patterns outward a projection central point or a projection central axis.

21. The auto-calibration device as recited in claim 17, wherein all of said at least two calibration patterns are different.

22. The auto-calibration device as recited in claim 17, wherein the image capturing device is a color camera, and all color arrangements for all of said at least two calibration patterns are different.

23. The auto-calibration device as recited in claim 17, wherein the image capturing device is a monochrome camera, and the shapes of all of said at least two calibration patterns are different.

24. The auto-calibration device as recited in claim 17, wherein a number of said at least two calibration patterns are four, and said calibrated corresponding area is a maximum inscribed rectangle.

* * * * *